G. J. ALBRECHT.
ENVELOP SEALING MACHINE.
APPLICATION FILED JULY 13, 1910.

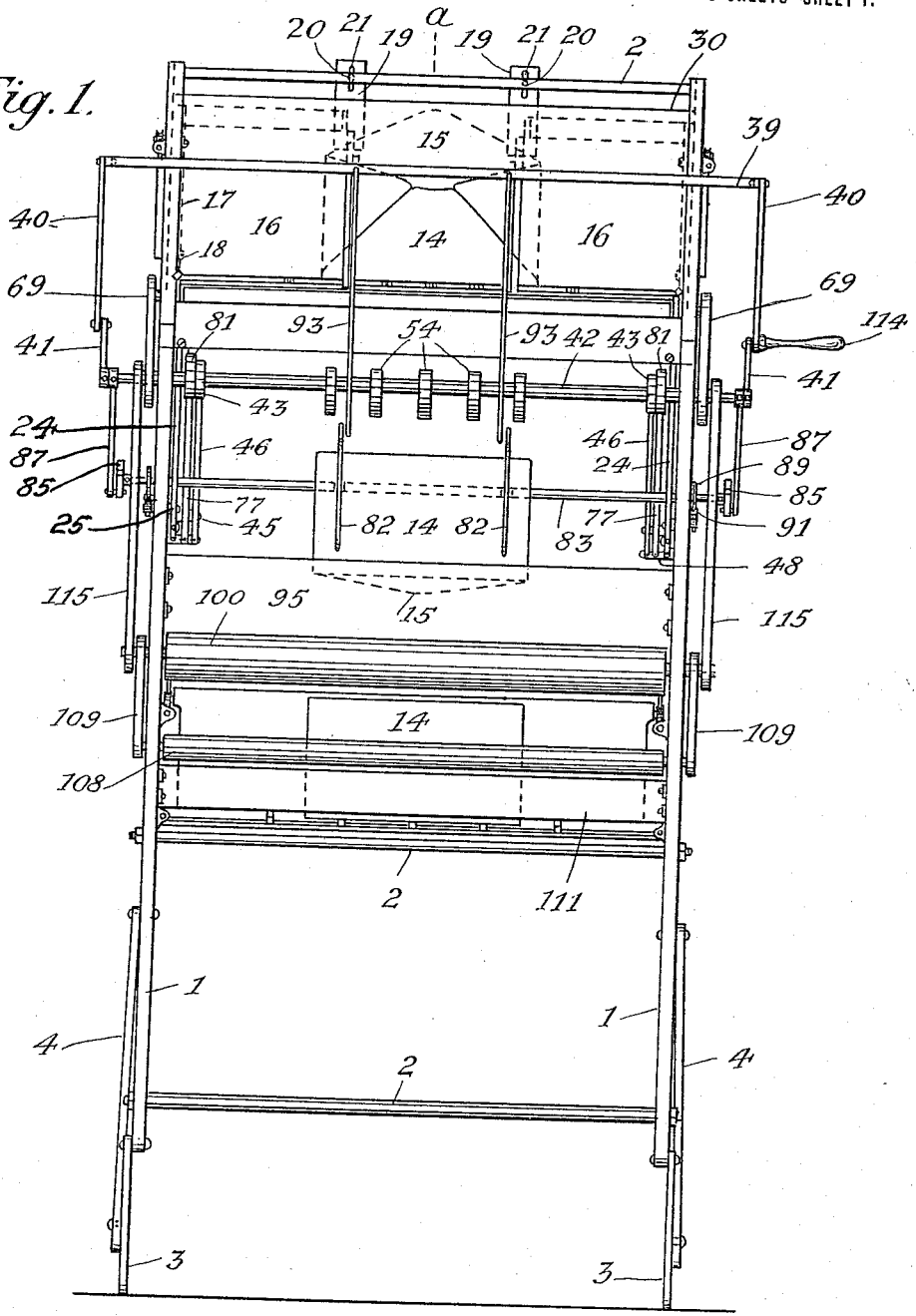

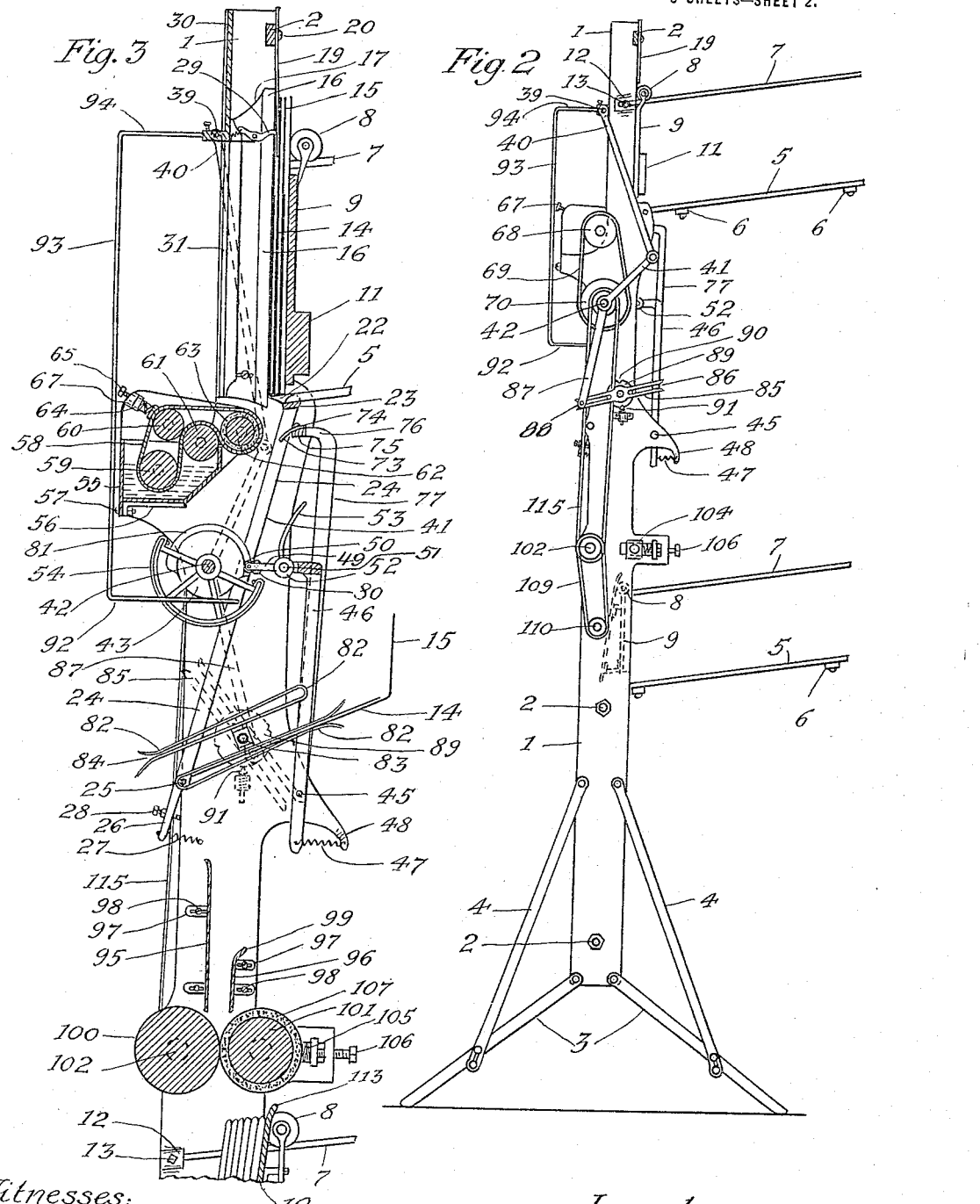

1,146,746.

Patented July 13, 1915.
5 SHEETS—SHEET 3.

Witnesses:
Theo. Lagaard.
H. A. Bowman.

Inventor:
Guido J. Albrecht.
By C. H. Funckel
his Attorney.

COLUMBIA PLANOGRAPH CO., WASHINGTON, D. C.

G. J. ALBRECHT.
ENVELOP SEALING MACHINE.
APPLICATION FILED JULY 13, 1910.
1,146,746.
Patented July 13, 1915.
5 SHEETS—SHEET 4.
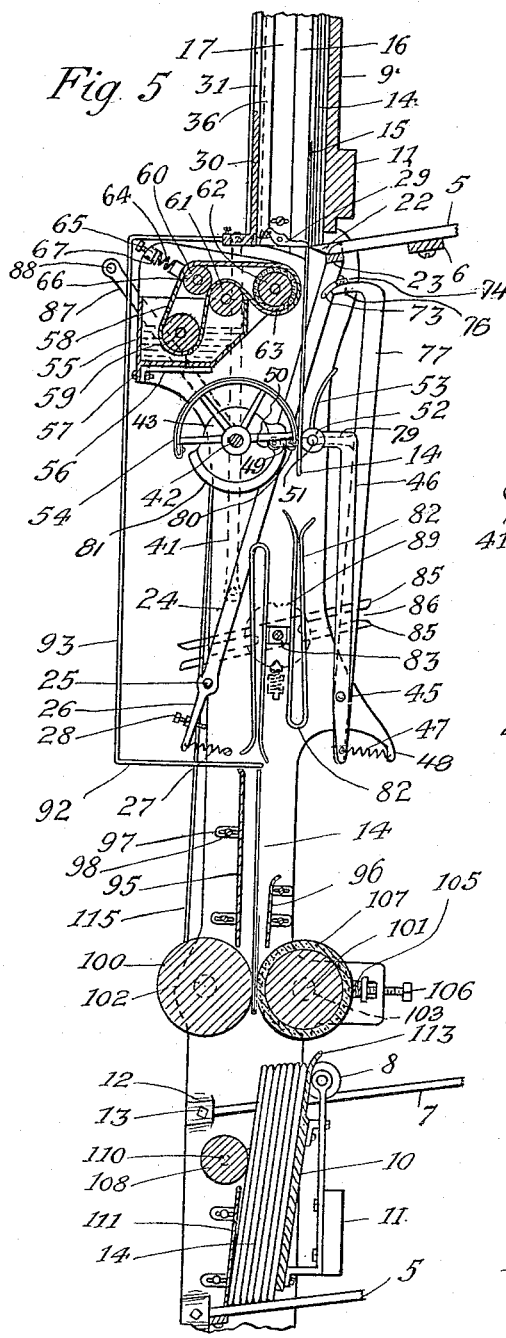
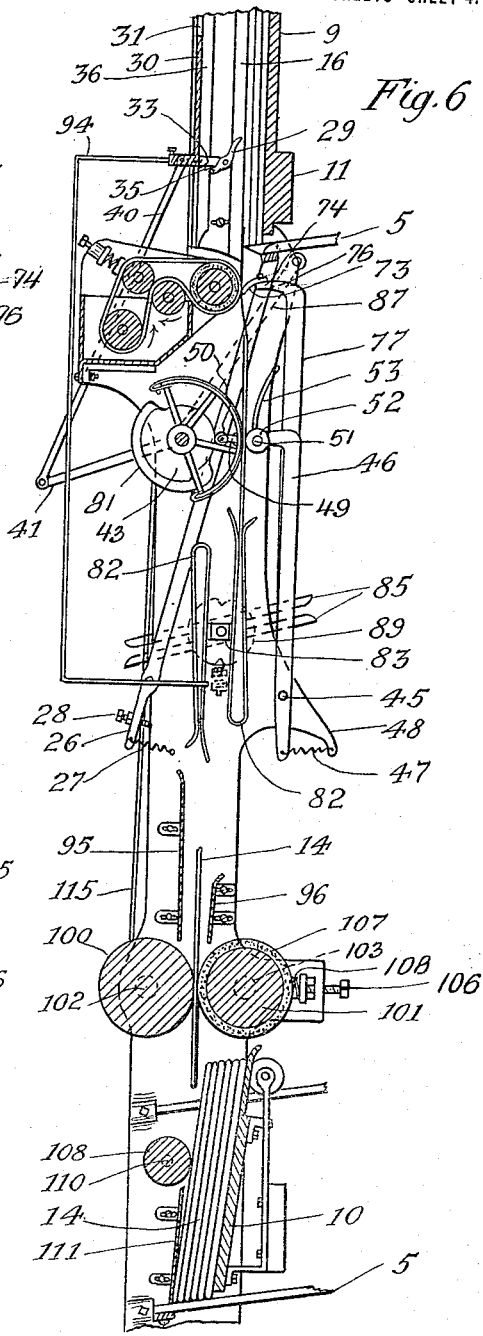
Witnesses:
Theo. Lagaard
H. A. Bowman
Inventor:
Guido J. Albrecht
By P. H. Gunckel
his Attorney

G. J. ALBRECHT.
ENVELOP SEALING MACHINE.
APPLICATION FILED JULY 13, 1910.

1,146,746.

Patented July 13, 1915.
5 SHEETS—SHEET 5.

Witnesses:
Theo. Laggard
H. A. Bowman.

Inventor:
Guido J. Albrecht.
By G. H. Gunckel
his Attorney.

UNITED STATES PATENT OFFICE.

GUIDO J. ALBRECHT, OF MINNEAPOLIS, MINNESOTA, ASSIGNOR TO LONG MAILING MACHINE COMPANY, OF MINNEAPOLIS, MINNESOTA, A CORPORATION.

ENVELOP-SEALING MACHINE.

1,146,746.  Specification of Letters Patent.  Patented July 13, 1915.

Application filed July 13, 1910. Serial No. 571,745.

*To all whom it may concern:*

Be it known that I, GUIDO J. ALBRECHT, a citizen of the United States, residing at Minneapolis, in the county of Hennepin and State of Minnesota, have invented certain new and useful Improvements in Envelop-Sealing Machines, of which the following is a specification.

My invention relates to envelop sealing machines, and its principal objects are improvement of the devices for moistening the gummed portions of the envelop flaps; and improvement of the means for presenting envelops in succession to and conducting them away from the moistening devices, and for sealing the flaps and delivering the sealed envelops to an assembling rack.

My improvements are illustrated in the accompanying drawings, in which—

Figure 11:
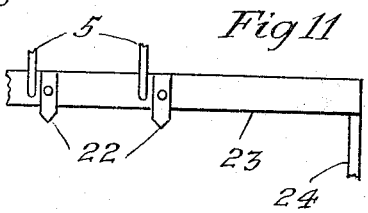
Figure 12:
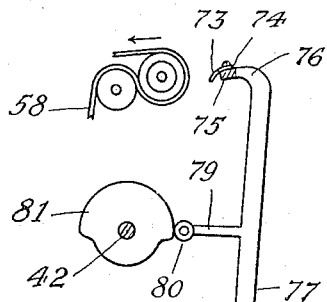
Figure 13:
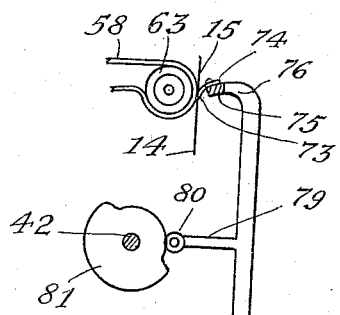
Figure 14:
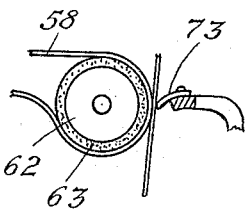
Figure 15:
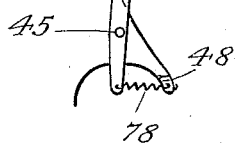
Figure 18:
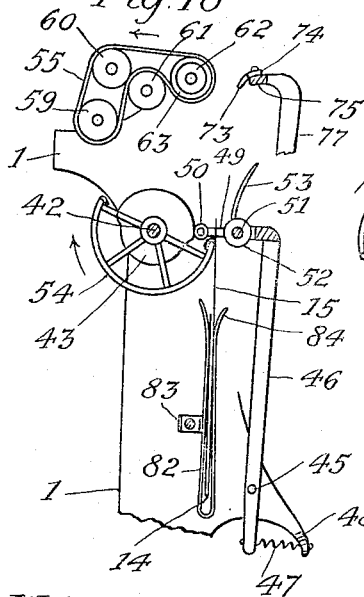
Figure 17:
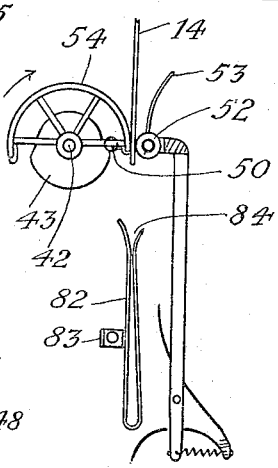
Figure 16:
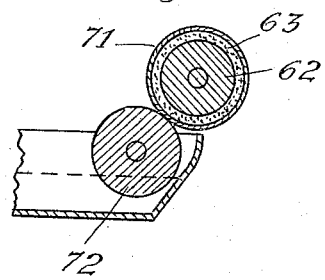

Figure 1 is an elevation of an envelop sealing machine embodying my improvements. Fig. 2 is an elevation of the same viewed from the right of Fig. 1. Figs. 3, 4, 5, and 6 are enlarged vertical sections of the machine on the broken line *a—a* of Fig. 1, showing different positions of the mechanisms at successive stages of the cycle of operations. Figs. 7 to 10 are detail views showing different positions of the envelop grapple and carrier. Fig. 11 is a plan view showing details of the devices for supporting the envelops on the feed-rack. Figs. 12, 13, 14, and 15 are detail views of the flap-moistening roller and the flap-presser and its operating cam for holding the flap to the roller. Fig. 16 shows a modification of construction of the flap-moistening rollers. Figs. 17 and 18 are detail views of the devices for receiving the envelop from the initial carrier and drawing it through the moistening devices.

In the drawings, the opposite vertical sides, which constitute the main frame of the machine, are designated 1, and the connecting cross-pieces 2. This frame work may be supported in any suitable way, but I prefer to support it on legs 3 pivoted to its lower portion and stayed by detachable braces 4 which are pivoted to the frame above, so that the legs and their braces can be conveniently folded to parallelism with the frame sides. A feed-rack for the unsealed envelops is secured near the top of the frame, and a similar rack for stacking the sealed envelops is provided a suitable distance below the feed-rack. The bottoms of the racks are formed of spaced inclined bars 5 connected by cross-bars 6 and both racks have tracks 7 above and parallel with the bars 5 on which are mounted the wheels 8 of gravitating follower plates 9 and 10, respectively, which carry weights 11 at their lower ends. By preference the rack bars and tracks are detachable, so that, when desired, they may be removed to reduce the space occupied by the machine. This may be accomplished by inserting the inner ends of the bars in sockets 12 on the frame in which they are held by binding-screws 13; or they may be removably held in place in any other convenient way.

The unsealed envelops 14 with their flaps 15 open and extending upwardly are placed on edge in the rack, the follower plate 9 bearing against the envelop bodies, while the wheels 8 contact with the flaps relatively near their opposite ends. The abutments against which the follower presses the envelops consists of a pair of plates 16 which have right angled flanges 17 that are attached by adjusting bolts 18 to the frame sides and extend inwardly past the tracks 7; and the wheels 8 press the flap ends lightly against a pair of light-tension flat springs 19 which are adjustably secured by screws 20 and slots 21 to the top cross piece 2 of the frame.

The inner ends of the rack bars 5 terminate a little distance outside the positions of the first two envelops of the stack, and these are supported on a series of flexible resilient fingers 22, preferably of rubber, that are supported close to the plates 16 by a transverse bar 23; and the ends of this bar are mounted on the tops of the longer arms of a pair of levers 24 which are fulcrumed to the frame at 25 and have their shorter arms 26 connected to the frame by tension springs 27. An adjustable stop 28 is provided for regulating the degree of movement of the shorter lever arm toward the frame side. By these means only the first envelop of the stack is permitted to be removed by the carrier.

Figure 9:
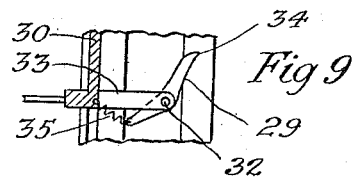
Figure 10:
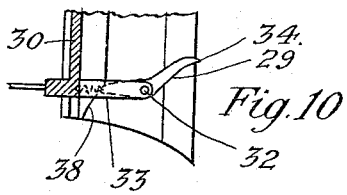

The envelops are removed in succession from the feed rack by means of a pair of grapples 29 which engage the open edge of the envelop near its ends. The grapples are supported and guided in their reciprocatory movements by a plate 30 that slides in vertical grooves 31 in the frame sides. The grapple is in form of a bent lever fulcrumed near its middle at 32 to a bracket 33 on the carrier plate 30, its working arm having a hooked or curved engaging end 34, and its inner arm connected to the carrier by a spring 35 the tension of which is to hold the grapple lever normally in the positions shown in Figs. 7 and 10. For swinging the grapple on its fulcrum a guide rib 36 is formed opposite the plate 16 on its securing flange 17 and provided with inclined offsets 37 and 38 at its upper and lower ends; whereby, when the grapple is reciprocated downward from position above the guide 36 (as in Fig. 7) its inner arm will contact with the incline 37 and swing the hooked arm to working position (shown in Fig. 8), and such position will be maintained until the grapple has been carried to the lower incline whereupon its spring will restore it to the position shown in Fig. 10; and then, upon the upward movement the position of the inner arm will be reversed, as shown in Fig. 9, and the grapple held in inoperative position until it has again reached its upper position. When in their upper positions the grapples are held from direct contact with the envelop flaps by the spring plates 19 against which they are lightly pressed by the tension of the springs 35, and as the grapples descend this pressure is increased by the contact of the inner grapple arms with the guides 36 which serves to press the flap away sufficiently to insure proper engagement of the grapples with the open edge of the envelop when they reach that point.

For operating the grapple carrier 30 a transverse bar 39 is attached to projections on its lower margin, and to the ends of the bar are pivoted links 40 which in turn are pivoted to crank arms 41 on a driving-shaft 42. The rotation of this shaft serves to reciprocate the carrier in its guide-ways 31 between its extreme upper and lower positions shown in Figs. 3 and 5. The working movements of the carrier serve to deliver the envelops in succession to a set of roller devices which then pull them and move them downward, during which movement they are subjected to the action of the flap-moistening devices.

On the shaft 42 near the sides of the frame are secured a pair of cam-wheels 43, and to projections 44 on the frame sides are fulcrumed at 45 a pair of levers 46 the lower arms of which are connected by tension springs 47 to lugs 48 on the projections 44. Lateral arms 49 extend inwardly from the tops of these levers and carry anti-friction rollers 50 that contact with the faces of the cams, the tension of the springs 47 tending to hold them in such engagement. The arms 49 also support a transverse rod 51 on which are loosely mounted a series of rollers 52, five being shown, in position to engage the descending envelop; and also a series of guide fingers 53 which extend upwardly and outwardly for directing the descending envelop toward the inner sides of the rollers 52. And on the shaft 42 are secured a corresponding series of roller segments 54 arranged to coöperate with the idler rolls 52 in engaging and drawing the envelop. The roller segments are so disposed on their shaft and the surfaces of the cams 43 are so arranged that the lower edge of an envelop may be presented in the open space between the rollers 52 and 54 before the latter are moved to engaging positions. So that when the envelop has reached a position approximately as shown in Figs. 5 and 17 the coöperating rollers 52 and 54 will clamp it, and the action of the latter rollers will draw it downward so long as the contact continues. The arcs of the segments, except the middle one, are so proportioned relative to the width of the envelops that the contact will cease practically at the time the upper edge of the envelop reaches the contact point, thus avoiding contact of the pulling rollers with the envelop flaps. It is desirable, however, to have the arc of the middle roller 54 somewhat longer than the others to permit that roller to maintain contact longer than the others and engage the middle portion of the flap to a point short of its gummed surface. The action of these rollers will serve to carry the envelop from the position shown in Fig. 5 to a position considerably below that shown in Fig. 6 (see Fig. 18.) The moistening of the flap is effected during this descent of the envelop.

The tank 55 for holding water for the moistening devices is supported on shelves 56 attached to the frame, and is removable upon unscrewing the screws 57 that hold it in place. The means for conveying moisture from the tank to the flap is a belt 58 of textile fabric, preferably linen, which runs on a submerged roller 59, thence between a superposed wringer composed of the rollers 60 and 61, and thence on a roller composed of a solid body 62 covered with an elastic yielding material 63, preferably soft or sponge rubber. The wringer rollers are held to proper frictional contact by pressure springs 64 the tension of which may be regulated by screws 65 operating between the slidable journal boxes 66 of the rollers 60 and studs 67 on the walls of the tank 55. These rollers are driven and the belt 58 operated by pulleys 68 on the shaft of the wringer roller 61 which are connected by belts 69 with pulleys 70 on the driving-shaft 42. In this way surplus moisture is removed from the belt 58 and a fresh portion of the belt is presented for moistening each successive flap as it is carried downward, while the contact portion of the belt moves in an opposite direction.

A modification of the moistening rollers is illustrated in Fig. 16, in which the belt 58 and the wringer rollers are dispensed with and the moistening roller is merely covered with linen 71 or other textile fabric. In this construction the wet roller 72 contacts with the moistening roller with sufficient friction to rotate it and, at the same time, to squeeze surplus moisture from the fabric on the moistening roller. In this way results of the same nature, but not as satisfactory as with the use of the wringer and traveling belt, may be obtained.

To press the flap to proper contact with the moistening roller a series of downwardly curved fingers 73 are provided on a strip 74 that is secured on a bar 75 extending across the machine and attached to the lateral arms 76 of levers 77 which are fulcrumed to the same pivots 45 that fulcrum the levers 46, and the lower arms of the levers 77 are similarly connected to the lugs 48 by tension spring 78. Horizontal arms 79 on the upper arms of the levers 77 carry anti-friction rollers 80 that contact with the faces of cam-wheels 81 on the shaft 42 adjacent to the cams 43. The faces of the cams 81 are so proportioned that when the envelop flap reaches a position intermediate the fingers 73 and the belt 58 the rollers 80 will ride on the inner cam surfaces and permit the tension of the springs 78 to move the fingers toward the moistening belt and hold the flap with moderate pressure against it. The effect of this pressure against the belt and yielding roller coating 63 is to slightly indent them at the points of the finger contacts and to cause the intermediate portions to slightly buckle outwardly, somewhat as illustrated in Fig. 15. This results in bringing all parts of the gummed margin of the flap into intimate contact with the moist belt and the consequent uniform moistening of that portion of the flap.

For receiving and removing the envelop after its flap has been moistened clips 82 are provided in position to permit the envelop to be pushed into them by the feeding action of the rollers 52 and 54. These clips are attached in pairs to a transverse bar 83 and their mouths 84 face in opposite directions; that is, those of one pair face upwardly when those of the opposite pair face downwardly. They may consist of wires bent to about the shape shown in Figs. 3 to 6. The bar 83 is a rocking-bar and is journaled in the frame sides. On the protruding ends of the bar are attached the envelop turners composed of guide strips 85 which provide between them guide-ways 86 extending the length of the guides. Crank-arms 87, carrying at their ends lateral pins 88, are secured on the outer ends of the shaft 42 for causing the pins 88 to engage in the guide-ways 86 and turn the guides 85 and with them the rocking-bar 83 a half turn at each rotation of the shaft 42. To stop the turners and hold them in proper positions when freed from the crank-pins 88 wheels 89 fast on the rock-shaft have opposite notches 90 in which spring-actuated dogs 91 yieldingly engage to hold the turners in normal positions, except when actuated by the cranks.

The action of the cranks 87 is so timed that the pins 88 will engage the turners as soon as an envelop is deposited in the receiving clips 82 and is free from engagement with the rollers 52 and 54, and will swing the turners a half revolution. An intermediate position of the envelop and the clips carrying it is indicated in Fig. 3, and the final or inverted position in Fig. 4. The clips exert sufficient pressure on the envelop to prevent it from falling when thus inverted, and to move it from the clips to engagement with the sealing rollers, it is started downwardly by the action of arms 92 extending inwardly from rods 93, the upper ends 94 of which are also bent inwardly and secured to the bar 39 and is therefore reciprocated by the operation of the cranks 41 and their connections. As the carrier 30 is moved downward to transfer a fresh envelop to the action of the moistening devices the rods 93 and their arms 92 are carried with it and push the inverted envelop from the position shown in Fig. 4 to that shown in Fig. 5. The descending envelop is guided to the sealing rollers by opposite guide-plates 95 and 96, which are laterally adjustable by means of slots 97 and binding-screws 98. The plate 96 is shorter than the plate 95 and has its upper edge 99 curved or flared to aid in folding the flap as the envelop descends.

The sealing rollers 100 and 101 are on shafts 102 and 103. The latter shaft is journaled in sliding boxes 104 which are yieldingly held by springs 105 and the spring pressure is regulated by screws 106; so that the roller 101 may yield as required for envelops of different thicknesses. The inverted envelop brought down by the pusher arms 92, with its flaps partly folded, is caught between the sealing rollers and by them fed downward and the flap completely folded and sealed. To give the roller 101 a proper frictional surface it may be coated with a layer of sponge rubber 107. When the sealed envelop has been thus lowered it passes to the lower rack. In passing to the rack it contacts with a pressure roller 108 that is operated by a belt 109 and pulleys connecting its shaft 110 with the shaft 102 of the roller 100, the pressure roller serving to press the newly-delivered envelop against the stack of envelops on the rack and to carry it down to the rack bottom. A plate 111 secured to the frame below the roller 108 serves as a guide and abutment for the last envelop. The follower plate 112 is set at a suitable inclination and its upper portion is curved outwardly to facilitate the admission of the first envelop to the rack.

For operating the mechanism the shaft 102 may be utilized as the driving-shaft but I prefer to use the shaft 42 which may be rotated by a handle 114 attached to the crank 41. Belts 115 connect pulleys on this shaft with pulleys on the shaft 102.

Figure 4:
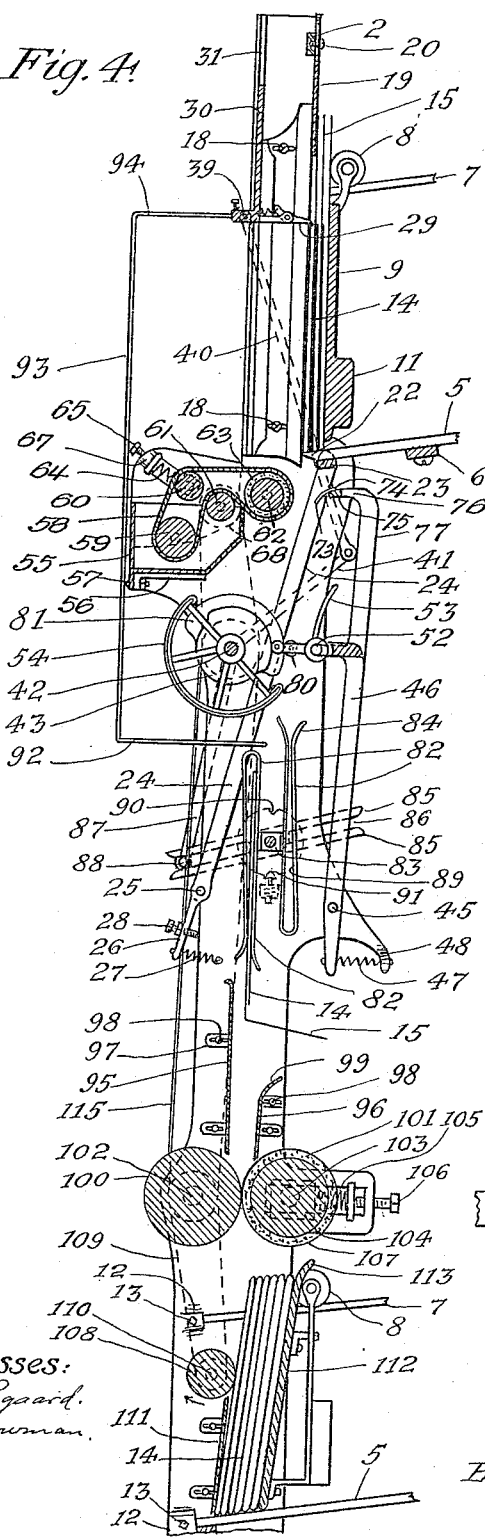
Figure 7:
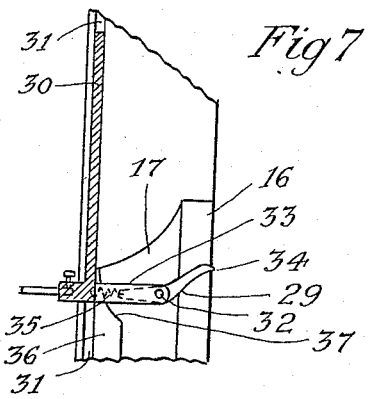
Figure 8:
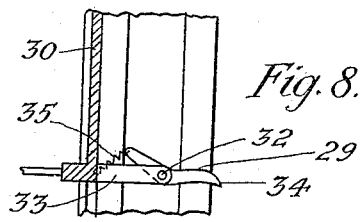

In operation, a rotation of the driving-shaft produces a cycle or sequence of actions about as follows: The grapples are moved downward from their extreme upper positions to engagement with the edge of the first envelop on the feed-rack and carry that envelop down to a position where its lower edge is in the space between the separated rollers 52 and 54. As the envelop reaches that position those rollers move to frictional contact with the lower margin of the envelop and pull it onward. When the flap reaches the space between the moistening belt 58 and the presser-fingers 73 the latter are actuated by their carrier to press the flap against the belt to moisten the gummed portion. Meanwhile the continued action of the rollers 52 and 54 will pull the envelop downward and seat it in the proper pair of clasps 82 with the flap projecting above the clasps. When the envelop has been thus delivered the crank 87 will have been revolved to position to enter the guide-way 86 of the turning device and revolve the latter from normal position to that shown by broken lines in Fig. 3, and thereafter pass out of the same groove in reverse direction at the opposite side of the machine, as shown in Fig. 4, thereby effecting a half revolution of the turning device. This results in inverting the clasps and envelop and putting the latter in position to be fed to the sealing rollers by the action of the follower arms 92. When thus lowered the envelop is subjected to the clamping action of the lower rollers and sealed and conducted to the lower rack.

Having described my invention, what I claim and desire to secure by Letters Patent is—

1. In an envelop sealing machine, means for holding a stack of envelops, means for removing them one at a time therefrom, coöperating feed-rollers for receiving the envelop delivered by the removing means, a flap-moistener over which the envelop is pulled by said rollers, the feed-rollers and flap-moistener being relatively movable, means for holding the flap to contact with the moistener while said rollers are pulling the envelop, a transferrer for receiving the envelop from said rollers, a sealing device, and means for moving the envelop from the transferrer to the sealing device.

2. In an envelop sealing machine, means for holding a stack of envelops, means for removing them one at a time therefrom, coöperating feed-rollers for receiving the envelop delivered by the removing means, a flap-moistener over which the envelop is pulled by said rollers, the feed-rollers and flap-moistener being relatively movable, means for holding the flap to contact with the moistener while said rollers are pulling the envelop, a transferrer for receiving the envelop from said rollers and inverting it, a sealing device, and means for removing the inverted envelop from the transferrer to the sealing device.

3. In an envelop sealing machine, means for feeding a stack of envelops, grapples for engaging the first envelop near its open ends, a carrier for the grapples and means for reciprocating it, coöperating feed-rollers for receiving the envelop directly from the carrier, a flap-moistener over which the envelop is pulled by said rollers, means for holding the flap to contact with the moistener while said rollers are pulling the envelop, a transferrer for receiving the envelop from said rollers, a sealing device, and means for moving the envelop from the transferrer to the sealing device.

4. An envelop sealing machine comprising a magazine and a moistener, means for feeding envelops from the magazine singly and in timed succession in a direction away from the flap edges thereof, means receiving the closed edges of the envelops from said feeding means and then pulling the envelop to drag the flaps over said moistener, and means timed in action relative to said feeding and pulling means to press the flaps against said moistener while the envelops are being pulled.

5. An envelop sealing machine comprising a magazine and a moistener, means for feeding envelops over said moistener transversely and flap last, means timed in action for pressing the flaps successively to said moistener after the bodies of the envelops have been fed past the same, and means for moving the moistener and flaps relatively while the flaps are being pressed against the moistener.

6. In an envelop sealing machine, means for feeding envelops edgewise when their flaps have been extended, a moistening device across which the extended flaps are dragged in frictional contact as the envelops are fed, a turner for receiving and inverting the envelops in succession, and means receiving the inverted envelops from the turner and sealing the flaps thereof.

7. In an envelop sealing machine, means for feeding envelops edgewise when their flaps have been extended, means for moistening the flaps in transit, holders for receiving the envelop bodies in succession, mechanism for turning the holders to invert the envelops in succession, stationary means so located as to engage the flaps to move the same toward the bodies of the envelops as the envelops are inverted, and sealing means for receiving the inverted envelops from the holders.

8. In an envelop sealing machine, means for holding envelops edgewise when their flaps have been extended, means for moistening the flaps in transit, holders for receiving the envelop bodies in succession, a pair of sealing rollers, means for turning the holders to direct the flap ends of the envelops toward the sealing rollers, a guide comprising a stationary member so located as to engage the flap as the envelop is moved by the holders and which thereby moves the flap toward the body of the envelop, and means to move the envelops from the holders through said guide to said rollers.

9. In an envelop sealing machine, means for feeding envelops edgewise when their flaps have been extended, means for moistening the flaps in transit, holders for receiving the envelop bodies with their flaps protruding, a pair of sealing rollers, means for turning the holders to direct the flap ends of the envelops toward the sealing rollers, a guide comprising long and short plates, and means to move the envelops from said holders through said guide to the rollers, said short plate permitting the envelops to enter the guide and engaging and closing the flaps as the envelops are moved.

10. In an envelop sealing machine, means for feeding envelops edgewise when their flaps have been extended, means for moistening the flaps in transit, holders for receiving the envelop bodies with their flaps protruding, a pair of sealing rollers, means for turning the holders to direct the flap ends of the envelops toward the sealing rollers, a guide comprising a pair of plates, and means to move the envelops from said holders between said plates, one of said plates engaging and moving the flaps toward the bodies of the envelop as the envelops are moved.

11. In an envelop sealing machine, means for feeding envelops edgewise when their flaps have been extended, means for moistening the flaps in transit, oppositely-facing holders for successively receiving and discharging the envelop bodies with their flaps protruding, a rocking support for such holders, means for effecting half revolutions of said support to invert the envelops, and means for discharging the inverted envelops from their holders.

12. In an envelop sealing machine, means for feeding envelops edgewise when their flaps have been extended, means for moistening the flaps in transit, oppositely-facing holders for successively receiving and discharging the envelop bodies with their flaps protruding, a rocking support for such holders, means for effecting half revolutions of said support to invert the envelops, means for discharging the inverted envelops from their holders, and means for folding and sealing the flaps of the discharged envelops.

13. In an envelop sealing machine, an initial holding and feeding device, a moistening device, a sealing device, a turner for receiving envelops from the moistening device and delivering them to the sealing device, and means for simultaneously pushing envelops from the initial feeding device and from the turner.

14. In an envelop sealing machine, an initial holding and feeding device, a turner, for receiving envelops from the moistening device and inverting them, a reciprocating member, and two sets of devices carried by said member for simultaneously pushing envelops from the initial feeding device and from the turner.

15. In an envelop sealing machine, an initial holding and feeding device, a turner for receiving envelops from the moistening device and inverting them, a reciprocating member, pivoted grapple levers on said member for engaging the open edges of envelops in the initial feeding device, and a rod on said member having a finger for engaging the closed edges of the inverted envelops in the turner, movement of the reciprocating member in one direction operating to move said engaged envelops simultaneously.

16. In an envelop sealing machine, a moistening device, a transferring device simultaneously operative in a plurality of planes, a sealing device, means intermediate the moistening and transferring devices for pulling envelops and their extended flaps edgewise past the moistening device and delivering them to the transferring device in one plane, means for moving said transferring device to bring the envelops therein into the operative plane of the sealing device, and means operating simultaneously to push envelops to the pulling means and from the transferring device.

17. In an envelop sealing machine, a moistening device, a transferring device simultaneously operative in a plurality of planes, intermediate coöperative sets of laterally spaced rollers for pulling envelops past the moistening device and delivering them to the transferring device in one of its operative planes, an envelop supply and a reciprocating member having means for feeding envelops singly to said rollers, arms carried by said reciprocating member having portions positioned to extend between said spaced rollers when the reciprocating member is at the end of its non-feeding stroke, and means for moving the transferring device to bring the envelops therein into another plane with their inner edges beneath the extended portions of said arms.

18. In an envelop sealing machine, means for stacking and feeding envelops with their flaps open, a reciprocating grapple carrier, grapples for engaging the open edges of the envelops near their ends, the grapples consisting of levers centrally fulcrumed to their carrier and having hooked working ends, and grapple guides having offsets at their ends for tripping the grapples to swing them to and from working positions.

19. In an envelop sealing machine, means for stacking and feeding envelops with their flaps open, a reciprocating grapple carrier, grapples for engaging the open edges of the envelops near their ends, the grapples consisting of levers centrally fulcrumed to their carrier and having hooked working ends, spring plates arranged to prevent the grapples from engaging the edges of the envelop flaps, and grapple guides having offsets at their ends for tripping the grapples to swing them to and from working positions.

20. An envelop sealing machine comprising moistening means, sealing means and means for feeding the envelops over the moistening means and to the sealing means when their flaps have been extended, a guide for receiving the envelops from the feeding means and directing them to the sealing means, said feeding means including a device for causing the flaps of the envelops to engage a portion of said guide and be moved thereby toward the bodies of the envelops as the envelops are fed.

21. In an envelop sealing machine, a moistening device, means for feeding envelops past said moistening device, a device comprising a plurality of separated engaging members, and resilient means for intermittently actuating said device to cause the members to engage the flaps in a plurality of separated places and press the same against said moistening device while the envelops are being fed.

22. In an envelop sealing machine, a moistening device, means for feeding envelops bodily flap last over said moistening device, and means engaging the flaps in a plurality of separated places and spring actuated to press the flaps against said moistening device while they are being fed, and means for holding said pressing means from contact with the bodies of the envelops as they are fed past the moistening device.

23. In an envelop sealing machine, a moistening device, means for feeding envelops past said moistening device, a member provided with teeth, and means actuated intermittently for causing said teeth to press the flaps against said moistening device.

24. In an envelop sealing machine, a moistening device, means for feeding envelops past said moistening device, a member provided with resilient teeth, and means for moving said member to cause said teeth to engage and press the flaps against said moistening device.

25. In an envelop sealing machine, a moistening device, means for feeding envelops past said moistening device, a member provided with teeth bent in the direction of travel of the envelop, and means for moving said member to cause said teeth to engage and press the flaps against said moistening device.

26. In an envelop sealing machine, a moistening device, means for feeding envelops past said moistening device, a bar provided with teeth, said teeth being spring actuated to press the flaps against said moistening device, and cams for withholding said teeth from action while the body portions of the envelops are fed past the moistening device.

27. In an envelop sealing machine, a moistening device, and means for pulling envelops past said moistening device with their flaps engaging the same, said means comprising separated members constructed so as to engage the bodies of the envelops adjacent the ends and intermediate thereof but being withdrawn from such engagement as the gummed flap passes.

28. In an envelop sealing machine, a moistening device, and means for pulling envelops past said moistening device, comprising sets of idler rollers and coöperating driven segmental rollers, the peripheral lengths of the intermediate segmental rollers being greater than that of the outer segments and all of said lengths being such that the engaging action of said rollers will terminate short of the gummed margin of the extended flaps.

29. In an envelop sealing machine, a moistening device, and means for pulling envelops past said moistening device, comprising sets of idler rollers and coöperating driven segmental rollers of large diameter relative to the segmental rollers, the peripheral lengths of the intermediate segmental rollers being greater than that of the outer segments and all of said lengths being such that the engaging action of said rollers will terminate short of the gummed margin of the extended flaps.

30. In an envelop sealing machine, a moistening device, and means for pulling envelops past said moistening device, comprising sets of idler rollers and coöperating driven segmental rollers of large diameter relative to the idler rollers, and curved guides adjacent said idler rollers for directing the envelops between the sets of rollers.

31. In an envelop sealing machine, a moistening device, coöperating sets of idler and driven rollers for pulling the envelops past said moistening device, and means for intermittently moving said rollers relatively to open a passage between the same for the reception of the lower edges of the envelops.

32. In an envelop sealing machine, a moistening device, coöperating sets of idler and driven rollers for pulling the envelops past said moistening device, said sets of rollers being spring-actuated normally to contact, and means rotating with the driven rollers to separate said rollers to permit the lower edges of said envelops to be inserted between the sets of rollers.

33. In an envelop sealing machine, a moistening device, coöperating sets of idler and driven rollers for pulling the envelops past said moistening device when their flaps have been extended, said sets of rollers being spring-actuated normally to contact, a member spring-actuated to press the flaps against said moistening device, and sets of cams rotating with the driven rollers operating intermittently to separate and hold the sets of rollers apart to permit an envelop to be inserted therebetween, and to withdraw and hold from action said pressing device until the flap comes opposite the moistening device.

34. The combination with a flap moistening device and means for feeding envelops singly and in timed succession to and past the same, of an envelop transferring device, said feeding means including a pair of coöperating rollers positioned between the moistening device and the transferring device independent of and for directing the envelops from the said moistening device to the transferring device, and sealing rollers receiving the envelops from said transferring device.

35. An envelop sealing machine comprising means for feeding envelops transversely when their flaps have been extended away from the direction of feed singly and in timed succession, a moistening device and means movable relative to the moistening device for pulling the extended flap of each envelop transversely over the moistening device so that it will be frictionally rubbed thereby.

36. An envelop sealing machine comprising means for feeding envelops transversely when their flaps have been extended singly and in timed succession, a moistening device, means movable relative to the moistening device for pulling the extended flap of each envelop transversely over the moistening device so that it will be frictionally rubbed, and means for pressing the flap against the moistening device while it is being pulled.

37. An envelop sealing machine comprising a magazine and a moistener, means for feeding envelops from the magazine when their flaps have been extended singly and in timed succession, means receiving the envelops from said feeding means and pulling the flaps over said moistener, a comb bar timed in action relative to said feeding and pulling means to press the extended flaps only against said moistener while the same are being pulled.

38. An envelop sealing machine comprising a magazine and a moistener, means for feeding envelops from the magazine singly and in timed succession when their flaps have been extended with the flap edge last, means movable relative to the feeding means for receiving the envelops therefrom and pulling the flaps over said moistener, and resilient means timed in action relative to said feeding and pulling means to press the extended flaps only against said moistener while the same are being pulled.

39. An envelop sealing machine comprising a magazine and a moistener, means for feeding envelops from the magazine singly and in timed succession when their flaps have been extended with the flap edge last, means receiving the envelops closed edge first from said feeding means and pulling the flaps over said moistener, and a reciprocating toothed member timed in action relative to said feeding and pulling means to press the extended flaps only against said moistener while the same are being pulled.

40. An envelop sealing machine comprising a magazine and a moistener, means for feeding envelops from the magazine singly and in timed succession when their flaps have been extended with the flap edge last, means receiving the envelop closed edge first from said feeding means and pulling the flaps over said moistener, a toothed member spring-actuated to engage and press the extended flaps against said moistener, and means timed in action relative to said feeding and pulling means to withhold said member from such engaging position until the bodies of the envelops have been moved past the moistener.

41. An envelop sealing machine comprising a magazine and a moistener, means for feeding envelops from the magazine when their flaps have been extended singly and in timed succession, means receiving the envelops from said feeding means and pulling the flaps over said moistener, a flap presser movable relative to the feeding means, and means timed in action relative to said feeding and pulling means to move the moistener and flap presser relatively to cause the flaps to be pressed between the same while the flaps are being pulled.

42. An envelop sealing machine comprising a magazine and a moistener, means for feeding envelops from the magazine when their flaps have been extended singly and in timed succession, means receiving the envelops from said feeding means and pulling the flaps over said moistener, a toothed bar and means timed in action relative to said feeding and pulling means to move the comb and moistener relatively to press the extended flaps between the teeth of the comb and the moistener while the flaps are being pulled.

43. An envelop sealing machine comprising a magazine and a moistener, means for feeding envelops from the magazine when their flaps have been extended singly and in timed succession, means movable relative to the moistener for receiving the envelops from said feeding means and pulling the flaps over said moistener, said feeding and pulling means being operative upon the envelops to forward the same in a plane spaced from said moistener, and means timed in action relative to said feeding and pulling means to press the extended flaps only against said moistener while the same are being pulled.

44. In an envelop sealing machine, a moistener and means for feeding envelops to and past the moistener in timed succession, holders for receiving the envelops from said feeding means comprising fingers normally spring-pressed into contact and between which the envelops are forced so that the fingers are caused to grip the envelop, and means for inverting the holders while the envelops are so gripped.

45. A machine for operating upon envelops comprising a moistener and means for feeding envelops to and past the moistener in timed succession, a turner for receiving the envelops from the feeding means including oppositely-facing holders, and means for effecting half revolutions of said turner to invert the envelops, said means operating to move the turner differentially and at the slowest speed upon approaching and leaving its stationary position.

46. A machine for operating upon envelops comprising a moistener and means for feeding envelops to and past the moistener in timed succession, a turner for receiving the envelops from the feeding means including oppositely facing holders, a rocking support for said holders having cam members extending therefrom at right angles to the holders, and a rotary device adapted to engage a cam member at each revolution thereof and effect a half revolution of said turner to invert the envelop.

47. A machine for operating upon envelops comprising a moistener and means for feeding envelops to and past the moistener in timed succession, a turner for receiving the envelops from the feeding means including oppositely facing holders, a rocking support for said holders, means for effecting half revolutions of said support to invert the envelops, and means coöperating with said support to hold the turner in its receiving position.

In testimony whereof I have signed my name to this specification in the presence of two subscribing witnesses this 25th day of June, 1910.

GUIDO J. ALBRECHT.

Witnesses:
H. A. BOWMAN,
P. H. GUNCKEL.

Copies of this patent may be obtained for five cents each, by addressing the "Commissioner of Patents, Washington, D. C."